United States Patent Office 3,292,867
Patented Dec. 20, 1966

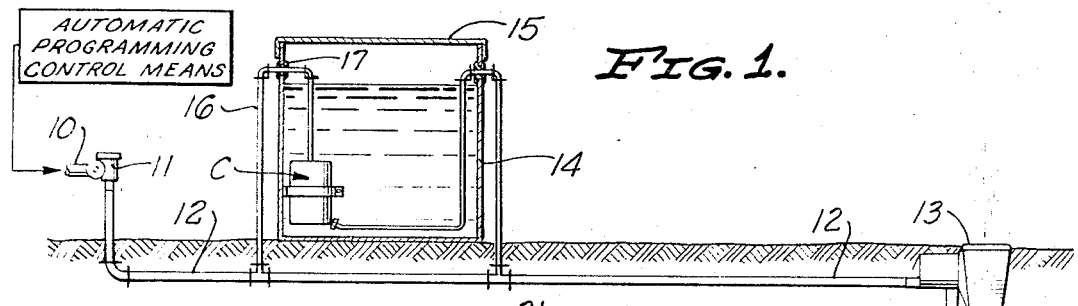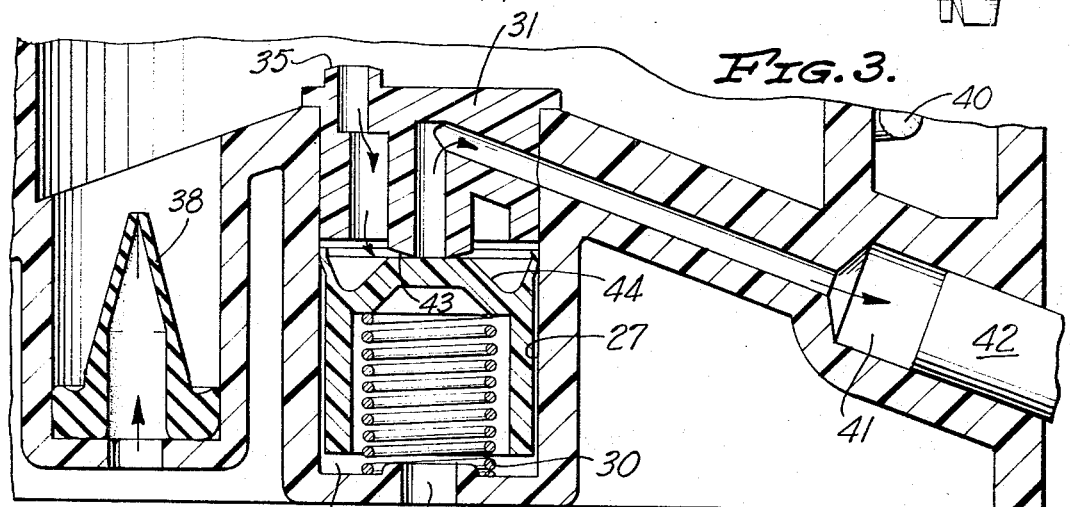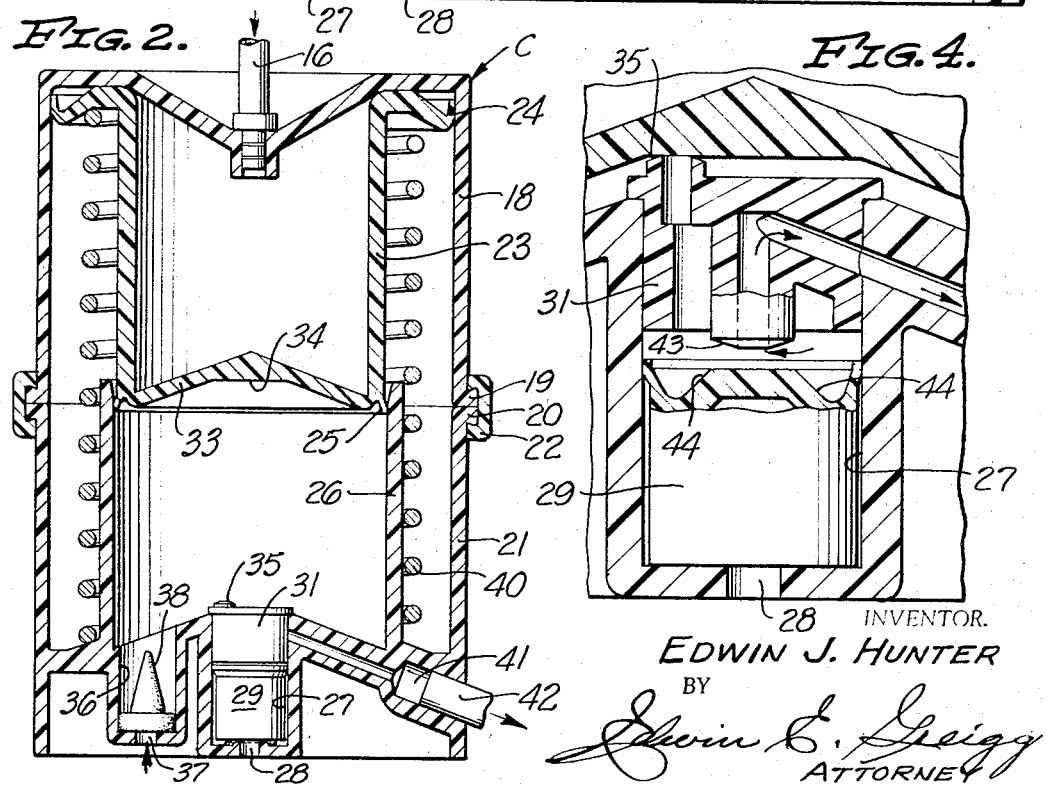

3,292,867
FERTILIZER EJECTOR
Edwin James Hunter, Riverside, Calif., assignor to Moist O'Matic Inc., Riverside, Calif., a corporation of Minnesota
Filed Aug. 21, 1964, Ser. No. 391,239
3 Claims. (Cl. 239—322)

This invention relates to improvements in fertilizer ejectors for dispensing predetermined quantities of a solution into irrigation or sprinkling water systems.

Heretofore, fertilizing devices which have been combined with cyclically operating irrigating and sprinkling water systems have been found to be inefficient since they have not contemplated furnishing a solution to the irrigation water in predetermined limited quantities, but rather in a continuous manner, thus wasting the fertilizer and as a consequence often impairing plants and law grass and frequently destroying both.

Accordingly, the principal object of this invention is to provide a simple, low-cost device which will supply a small, predetermined quantity of solution containing a high concentration of nitrogen into a cyclically operated sprinkling water system and will introduce this charge into the stream of water at the beginning of each irrigation cycle.

Another object of this invention is to provide a device which draws a charge of fertilizer solution for each injection cycle from a container or other large supply source so that one filling of the container will last for a long period of time, thereby requiring only infrequent servicing or refilling of the unit.

It is still another object of this invention to supply a predetermined measure of fertilizer solution to the water stream during the first two minutes of the irrigation cycle since the amount of supplemental water supplied through the sprinkling system may be varied according to weather conditions.

A still further object of this invention is to supply a uniform amount of fertilizer in the form of a solution to a stream of water while at the same time providing a wide range of adjustment in the amount of water that is discharged through the sprinkling system.

The details of the invention, as well as additional objects and advantages, will be clearly understood with reference to a preferred embodiment illustrated in the accompanying drawings employing similar reference numerals to identify the same elements in each of the several view, and in which:

FIG. 1 is a ground elevational view taken partially in section and partially in elevation schematically showing one sprinkling circuit including this improvement;

FIG. 2 is substantially entirely a cross-sectional view of the ejector with certain elements taken in elevation;

FIG. 3 is an enlarged cross-sectional view of the lower area of the device clearly showing the valve details in section; and FIG. 4 is a still further enlarged view partially in section and partially in cross-section of one of the valves in closed position.

Turning now to the drawings, FIG. 1 discloses a conduit 10 leading to a double valve assembly 11 through which water is introduced by automatic controls to provide convenient adjustment of the running time of the sprinklers 13, which is variably controlled from three to sixty minutes. The double valve assembly 11 shown in the drawing does not constitute a part of this invention and comprises a well-known type required under certain codes to prevent backflow of sprinkling water into a water supply. A flexible conduit 12 feeds the water from the source of supply through the double valve assembly 11 to the sprinkler head which is, in this instance, the type known as a Wave Sprinkler manufactured by the Moist O'Matic Division of Toro Manufacturing Corporation, but any other sprinkler will suffice for use with the improvement to be disclosed herein.

With further reference to FIG. 1, there is shown positioned at ground elevation a suitable receptacle or container 14 which is filled with a highly concentrated soluble fertilizer solution, the receptacle being provided with a suitable cover 15.

It is to be understood that a fertilizer ejection into a sprinkling system should only be conducted if there is adequate protection upstream to insure that there is no possibility of water that has been contaminated by the fertilizer solution ever flowing backward into the potable water system, and thereby contaminating this water also. Therefore, it is necessary to install the fertilizer ejector downstream from the shut-off valve and backflow protection device and one ejector unit is required for each section of the sprinkler system. Typical residential sprinkling systems, for example, are usually separated into anywhere from two to twelve sections.

At 16 there is shown a flexible conduit which has been coupled into the flow line 12 by any suitable media such as T-shaped nipple and clamp means, not shown, or any other means which will be apparent to those skilled in the art and which does not constitute a part of this invention.

Conduit 16 passes through a grommet 17 positioned in a perforation in the wall of the container and downwardly to a position where it is suitably attached to the fertilizing charge dispenser constituting this invention and which is indicated generally at C.

As best shown in FIG. 2, the charge ejector or dispenser comprises an upper cup-shaped member 18 which is used in an inverted position and includes at its perimeter a collar 19 which is complemental to a collar 20 also formed as an integral part of the lower portion of the ejector as illustrated at 21. The collars of the upper and lower elements are held in juxtaposed abutted relation by an annular spring clip means shown at 22.

A piston 23 constructed of polyethylene or any other plastic material having similar characteristics is positioned within the cup-shaped member 18 and includes an outwardly flared sealing lip or rim portion 24 which is in intimate sliding contact with the interior wall thereof. The lower extremity of the piston 23 includes an offstanding annular lip 25 which slidably engages the interior of cylinder wall 26, the latter being formed integrally with and concentrically of the lower element 21. The lower element of the ejector includes an axially disposed chamber 27 with the bottom wall being apertured at 28 thus opening the chamber to atmospheric pressure. A secondary piston or valve 29, also made of polyethylene and having an area substantially lesser than that previously described in connection with the primary piston 23, is slid into the chamber 27 and adapted to confine a lightweight spring 30. A flow controlling element 31 suitably apertured, as shown, thus providing a tortuous path therethrough as indicated by the arrows, is securely positioned by a press fit into chamber 27 above the secondary piston or valve 29.

It will be noted that the exterior face of the piston 23 is complemental to the upstanding dome-shaped inner wall of the lower portion of the ejector (FIG. 4) and that the only protrusion extending thereabove is the valve seat 35.

During the extrusion of the lower element 21 from plastic material, such as "Delrin," a secondary chamber 36 is formed therein and a perforation is included at 37 to allow introduction of the solution through the aforementioned chamber upon the suction stroke of the piston 23. A check valve 38, well known in the trade as a "Duckbill," is positioned in chamber 36 and prevents return of the solution to the potable water supply. The spring 40, which is disposed about the upstanding concentric wall 26, also surrounds the exterior wall of piston 23 and is confined within the flanged area forming the annular divergent portion of the sealing lip 24 (FIG. 2). The function of this spring will be best understood from a perusal of the operation of this device which will be set forth hereinafter.

One of the critical features in the design and construction of this device was the creation of a novel discharge valve. It was determined that in order for the valve to have high performance characteristics that it should be designed to provide a high unit pressure on the sealing seat 35 of the valve so that the discharge pressure would operate against a piston with 64 times the area of the discharge port or seat so that any spring combined in the assembly would allow the valve to open at relatively low pressure but still provide a high unit pressure against the seat to effect a positive seal against flow when the sprinklers are turned off. In the course of experimentation it was noted that during the discharge stroke and before discharge actually started to occur that sufficient pressure would build up in the circuit to push the piston 29 down against its spring 30 to the extreme end of its stroke and thus hold the outlet valve in the fully opened position during the entire discharge stroke. It was also observed during tests that such a construction eliminated to a considerable extent the valve trapping any debris or other solid matter on the seat thereof that could later cause the valve to leak. At the end of the discharge stroke (FIG. 4), the ejector piston 23, the lower face of which is provided with a horizontal surface 34, contacts seat 35 with very high unit area of pressure to effectively seal off the discharge port at the end of the ejection stroke to prevent either further flow of the fertilizer solution into the line or backflow water from the sprinkler line which could dilute the fertilizer solution. However, it is to be understood that the outlet valve must not pass any fluid until the pressure in the piston chamber rises to above a certain minimum, usually about 5 p.s.i. If this check valve should fail to seal against low pressure, it would be possible for the fertilizer solution to flow slowly through the inlet check valve 39, through the outlet check valve, and into the sprinkling system during the period when the sprinklers are not in operation. If this should occur, even very slowly, a large amount of highly concentrated solution could accumulate in the sprinkler line which would eventually cause damage to the growing plants and lawn grass.

The exterior wall of the lower portion of the ejector 21 is provided with an angularly related perforation at 41 associated with the outlet passage of the flow controlling element 31 and is adapted to permit introduction of a flexible conduit 42 which feeds the soluble fertilizer from the ejector to the sprinkler water. The conduit passes through a grommet positioned in a wall of the receptacle as mentioned hereinbefore and its association with the conduit 12 may be accomplished in substantially the manner previously described in connection therewith.

OPERATION

Assuming the installation has been made and preparatory to discharging the fertilizer from the ejector into the sprinkling water, the water supply leading to the double valve assembly 11 is turned on through an automatic sprinkling system and continues to remain open for three to sixty minutes depending on the requirements for supplemental irrigation and to achieve controlled fertilization as well as watering of the lawn grass, plants, etc. As water flows from the valve 11 into sprinkler conduit 12 and then to the sprinkler 13, pressure rapidly builds up in the line and this pressure is carried through line 16 against the working face of the large piston 23 in the discharge unit. As soon as the water gains access to the interior of the piston 23 and builds up approximately 10 lbs., it begins to move the same downwardly against the spring 40 and thus ejects the soluble fertilizer solution contained in the area formed by the head of the piston 23 and the inner concentric wall 26 out through the valve 35, and at the same time overcoming the lower spring urged valve 29, thereby discharging the solution through line 42 into the sprinkler conduit 12. It will normally take from 60 to 180 seconds for the piston to complete its stroke, forcing the charge of fertilizer solution into the sprinkler line. The piston 23 will remain in its lowermost position with the spring compressed until the sprinkler valve 11 closes, thereby shutting off the flow of water to the sprinkler. When the piston 23 reaches the bottom of its stroke, completely emptying the chamber of solution, spring 40 which is now compressed begins to expand and urge the piston upwardly, at which time a new charge of solution is pulled into the chamber through the Duckbill-type valve 38 contained in the area formed by the head of the piston 23 and the inner concentric wall 26. Simultaneously with the rise of piston 23, its horizontal wall portion 34 is lifted from the valve seat 35 and the spring 27 may now advance valve 29 into its closed position, best shown in FIG. 3. Thus, from the foregoing a new charge is confined within the ejector ready for the next cycle of the sprinkling system, at which time when the water is reintroduced into the piston 23 from conduit 16, as previously explained, the same operation will take place and a new charge of fertilizer will be ejected into the sprinkling water.

It is contemplated that this device will be utilized with a sprinkler system, one unit of which is capable of discharging sufficient solution of the highest concentration possible to supply the nitrogen requirements for 2500 square feet of lawn, this being the largest area generally watered with one valve or sprinkling section in typical residential sprinkling systems. Where the areas are less than 2500 square feet, the fertilizer solution used can be diluted accordingly. Thus, if the area sprinkled by a particular unit covers only 1250 square feet, the highly concentrated fertilizer solution would be diluted with an equal amount of water which would thereby reduce by one-half the amount of nitrogen applied in each irrigation cycle.

Although one embodiment of the invention has been depicted and described, it will be apparent that this embodiment is illustrative in nature and that a number of modifications in the apparatus and variations in its end use may be effected without departing from the spirit or scope of the invention as defined in the appended claims:

What I claim is:

1. In an apparatus for cyclically ejecting into the flowing water of a sprinkling system at the beginning of each irrigation cycle a predetermined quantity of liquid fertilizer comprising in combination automatic programming control means for introducing water into a plurality of conduits leading to a double valve assembly, a conduit extending from the double valve assembly to an ejector, a receptacle, a solution in said receptacle, an ejector means provided with means defining plural flow openings therein associated with the solution in the receptacle, a valve means, second and third conduit means constituting flow openings in the ejector with communication therebetween controlled by said valve means, each of said latter conduits also being in communication with the solution in said receptacle and means within the ejector for dispensing a charge of the solution therefrom through the third conduit into the stream conveyed by the first conduit upon actuation of the ejector means by flow in the first conduit.

2. In a device as claimed in claim 1, wherein the means within the ejector for expelling a charge therefrom includes a chamber, a pressure operated means in said chamber and means for returning the pressure operated means to its initial inoperative position to replenish the solution supply within said chamber preparatory to discharge of a succeeding charge from the ejector upon reactivation of said pressure operated means.

3. In a device as claimed in claim 1, wherein the ejector is positioned within the receptacle.

References Cited by the Examiner
UNITED STATES PATENTS

| | | | |
|---|---|---|---|
| 1,736,803 | 11/1929 | Shields et al. | 137—564.5 |
| 2,323,618 | 7/1943 | Ottoson | 137—564.5 |
| 2,540,290 | 2/1951 | Rappl et al. | 239—331 |
| 2,743,959 | 5/1956 | Nelson et al. | 239—331 |
| 2,865,388 | 12/1958 | Sternberg | 137—564.5 |
| 3,166,096 | 1/1965 | Lang | 239—323 |

M. HENSON WOOD, Jr., *Primary Examiner.*

R. S. STROBEL, *Assistant Examiner.*